3,149,084
BLOWING AGENT COMPOSITION
Charles Minor Barringer, Chadds Ford, Pa., assignor to
E. I. du Pont de Nemours and Company, Wilmington,
Del., a corporation of Delaware
No Drawing. Filed Aug. 7, 1961, Ser. No. 129,509
6 Claims. (Cl. 260—2.5)

This invention is directed to dispersions of N,N'-dimethyl-N,N'-dinitrosoterephthlamide in hydrocarbon oils, in which dispersions the viscosity has been reduced by the incorporation therein of a copolymer of 2-diethylaminoethyl methacrylate and an ester of methacrylic acid with a long chain alcohol.

N,N'-dimethyl-N,N'-dinitrosoterephthalamide is a blowing agent used in the preparation of cellular polyvinyl chloride and for expanding other plastics and elastomers. For certain uses, as in preparing cellular materials from certain liquid reaction products of organic diisocyanates and polyhydroxy compounds, it is desirable to use the blowing agent in the form of a dispersion in a hydrocarbon oil. When N,N'-dimethyl-N,N'-dinitrosoterephthalamide is dispersed in a hydrocarbon oil, the resulting composition is very viscous, tends to settle and separate, is difficult to handle, and cannot be readily dispersed into a liquid polymeric composition.

It is, therefore, an object of this invention to produce dispersions of N,N'-dimethyl-N,N'-dinitrosoterephthalamide in hydrocarbon oils, which dispersions have decreased viscosity and are thus more suitable for use in the preparation of cellular products from polymeric materials; these more fluid dispersions are readily pumpable and are easily dispersible in the polymeric composition.

These and other objects will become apparent in the following description and claims.

More specifically, the present invention is directed to a composition comprising, by weight, (a) 20 to 40 parts of N,N'-dimethyl-N,N'-dinitrosoterephthalamide, (b) 80 to 60 parts of a naphthenic hydrocarbon oil having a Saybolt viscosity at 37.8° C. (100° F.) of between about 75 seconds and 400 seconds, the total of (a) and (b) equaling 100 parts, containing, in addition, (c) about 0.1 to 1 part, by weight, of a copolymer containing units of (1) 2-diethylaminoethyl methacrylate and (2) units of a monomer of the general formula

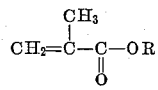

wherein R is an acyclic hydrocarbon radical containing 10 to 20 carbon atoms, the final polymer containing, by weight 5–20 percent of units of 2-diethylaminoethyl methacrylate, and the sum of (1) and (2) being at least 35 percent by weight of the total copolymer.

N,N'-dimethyl-N,N'-dinitrosoterephthalamide is available commercially as a powder containing 70% by weight of this compound and 30% of a naphthenic hydrocarbon oil having a Saybolt viscosity at 37.8° C. of 369 and a specific gravity at 15.6° C. of 0.8836. The hydrocarbon oil is added to render the amide less sensitive to impact and friction. The compound, N,N'-dimethyl-N,N'-dinitrosoterephthalamide, and its preparation are disclosed in U.S. Patent 2,754,326. For convenience, this compound will be referred to in the following discussion as the "blowing agent."

Since the oil acts as a carrying medium for the blowing agent, the oil should be one which is compatible with the final resin composition into which it is to be introduced. It should be sufficiently viscous to have a reasonable degree of suspending power for the blowing agent. Also, the use of an extremely viscous hydrocarbon oil should be avoided for obvious reasons. Hydrocarbon oils having Saybolt viscosities at 37.8° C. (100° F.) of about 75 seconds to about 400 seconds may be used. For the purpose of this invention, hydrocarbon oils of the naphthenic type have been found particularly suitable. In practicing this invention the final composition comprises the blowing agent, the desensitizing oil, and the oil which has been added as the carrying medium. The desentitizing oil merely adds to the hydrocarbon oil diluent and its presence in the final composition is not a critical part of the invention.

In order to add as much as possible of the blowing agent to the material to be blown and as little as possible of hydrocarbon diluent, it is preferred that the compositions of this invention contain no less than 20 percent by weight of the blowing agent, based on the combined weight of the blowing agent plus naphthenic hydrocarbon oil. If the composition contains more than about 40 parts of the blowing agent, it usually becomes too viscous to handle conveniently even when the copolymer component is added.

The copolymers to be used in the dispersions of this invention are copolymers of 2-diethylaminoethyl methacrylate and an ester of methacrylic acid with a long-chain alcohol containing 10 to 20 carbon atoms in the chain. For convenience, this ester will hereafter be referred to as the alkyl methacrylate, although it is to be understood that this radical may contain one or more double bonds. The copolymer should contain 5 to 20 percent by weight of units derived from 2-diethylaminoethyl methacrylate. The remainder of the copolymer is made up of units of the alkyl methacrylate, or, optionally, up to 65% of polymer may consist of units from another copolymerizable olefinic compound which serves as an extender for the copolymer. Typical examples of these extender components include the well-known shorter-chain ethylenically-unsaturated addition polymerizable monomers such as the vinyl and allyl formates, acetates, propionates and butyrates, and the like; polymerizable unsaturated short-chain monoolefinic or diolefinic hydrocarbons such as ethylene, propylene, isobutylene, styrene, vinyltoluene, butadiene, and isoprene, and the like; unsaturated short-chain carboxylic acids and their derivatives such as the alphamethylene carboxylic acids and their derivatives, e.g., acrylic acid, methyl methacrylate, acrylonitrile, methacrylamide, and the like; the short-chain unsaturated ethers, particularly the vinyl and allyl ethers, e.g., ethyl vinyl ether, butyl vinyl ether, allyl glycidyl ether, and the like. These copolymers and their preparation are described in Canadian Patent 538,373 and in U.S. Patent 2,737,452.

Typical examples of alkyl methacrylates which are particularly suitable for preparing the copolymers to be used in practicing this invention are technical lauryl methacrylate and technical octadecenyl methacrylate. Technical lauryl methacrylate is the methacrylic acid ester of technical lauryl alcohol which is obtained by reduction of the fatty acids of coconut oil and is a mixture of saturated straight-chain alcohols ranging from about 10 to 18 carbon atoms. A typical example will contain approximately 3% $C_{10}$, 61% $C_{12}$, 23% $C_{14}$, 11% $C_{16}$ and 2% $C_{18}$ alcohols. The technical octadecenyl methacrylate is the methacrylic acid ester of technical octadecenyl alcohol which is obtained by the sodium reduction of sperm oil and is a mixture of saturated (36%) and unsaturated (61%) straight-chain primary alcohols, most of which contain 14 to 18 carbon atoms. Octadecenyl alcohol is the principal component. The details of the composition are as follows:

|  | Percent |  | Percent |
|---|---|---|---|
| Decanol | 1 | Dodecenol | 1 |
| Dodecanol | 2 | Tetradecenol | 4 |
| Tetradecanol | 4 | Hexadecenol | 16 |
| Hexadecanol | 18 | Octadecenol | 37 |
| Octadecanol | 11 | Eicosenol | 3 |
|  | 36 |  | 61 |

Examples of particularly suitable copolymers to be used in practicing this invention are those having the following range of compositions by weight, expressed as the quantity of monomer which has been incorporated into the copolymer:

(a)

| | Percent by weight |
|---|---|
| Technical lauryl methacrylate | 90–95 |
| 2-diethylaminoethyl methacrylate | 10–5 |

(b)

| | |
|---|---|
| Technical octadecenyl methacrylate | 45–50 |
| Styrene | 35–40 |
| 2-diethylaminoethyl methacrylate | 20–10 |

For convenience the copolymer may be used as a solution in an inert hydrocarbon such as kerosene. This added hydrocarbon is negligible with respect to the large amount of the hydrocarbon already present in the composition.

The copolymer is added to the blowing agent and hydrocarbon mixture in amounts ranging from about 0.1 to about 1 part per 100 parts of the mixture. Amounts less than 0.1 part have insufficient effect on the viscosity and amounts greater than 1 part are not usually required.

The ingredients of the dispersion may be blended by conventional methods. For example, the terephthalamide in the form of agglomerates containing 30% of the desensitizing oil can be stirred mechanically with the hydrocarbon diluent. This composition may then be passed through a three-roll paint mill or other apparatus which will effectively break up the agglomerates of the terephthalamide. To this composition the copolymer additive may be added in a standard mixer. Equally satisfactory results are obtained when the copolymer is added to the hydrocarbon diluent before it is mixed with the terephthalamide. Other methods of blending are within the scope of those skilled in the art.

When the copolymer is added to the mixture of blowing agent and hydrocarbon oil, there is observed a surprising decrease in viscosity of the composition. This facilitates handling of the compositions. They may be pumped to the point of use and readily incorporated into compositions from which cellular materials are to be prepared. They are particularly suitable for use in the preparation of cellular materials from liquid reaction products of diisocyanates and polyalkylene ether glycols such as are described in U.S. Patent 2,929,800 and U.S. Patent 2,917,489. Using a liquid polyurethane and the dispersions of the blowing agent of this invention, vulcanizates can be produced in densities ranging from 7 to 60 pounds per cubic foot. These vulcanizates are micro-cellular in nature, that is, they contain very small pores, and are useful in such items as seals, belts, rolls, wheels, and shock or sound absorption applications.

Representative examples illustrating the present invention follow:

EXAMPLE A

The procedure used in the following examples is as follows:

A power composed of 70 parts by weight of N,N'-dimethyl-N,N'-dinitrosoterephthalamide and 30 parts of a desensitizing hydrocarbon oil (hereafter for convenience called the desensitizing oil), which is a naphthenic oil having a Saybolt viscosity at 37.8° C. of about 369 seconds and a specific gravity at 15.6° C. of 0.8836, are mixed in the specified proportions with the hydrocarbon oil. The mixture is then placed on a three-roll paint mill and given a single pass through the rolls. Cooling water is used on the rolls to prevent development of heat which may cause rapid decomposition of the blowing agent. The copolymer described in Example XI of Canadian Patent 538,373 is added as a 50% solution in kerosene, and the material is mixed on a high-shear mixer until the blend is homogeneous. An Eppenbach mixer is used in these examples.

The Brookfield viscosity is measured on a Model LV viscometer at 25° C. before and after addition of the copolymer. The copolymer used has the following composition, by weight, expressed as content of the original monomers in the polymer:

| | |
|---|---|
| Technical octadecenyl methacrylate | 50 |
| Styrene | 40 |
| 2-diethylaminoethyl methacrylate | 10 |

EXAMPLE 1

In this example the oil carrier is a naphthenic hydrocarbon oil having a specific gravity at 15.6° C. of 0.878, an aniline point of 35° C., a distillation range of 313–368° C., and a Saybolt viscosity at 37.8° C. of about 79 seconds. The blends tested have the following composition:

| | Parts by Weight |
|---|---|
| N,N'-dinitroso-N,N'-dimethylterephthalamide | 23 |
| Desensitizing oil | 10 |
| Added naphthenic hydrocarbon oil | 67 |
| Copolymer | As shown |

The Brookfield viscosities of compositions containing no copolymers and varying amounts of copolymer are shown in Table I.

Table I

| | Copolymer content, parts by weight | Brookfield viscosity at 25° C., centipoises |
|---|---|---|
| A | 0 | 1,000 |
| B | 0.1 | 316 |
| C | 0.25 | 256 |
| D | 0.5 | 230 |
| E | 1.0 | 212 |

EXAMPLE 2

This experiment is identical to Example 1 except that the blends tested have the following composition:

| | Parts by weight |
|---|---|
| N,N'-dimethyl-N,N'-dinitrosoterephthalamide | 35 |
| Desensitizing oil | 15 |
| Added hydrocarbon oil (same as in Example 1) | 50 |
| Copolymer | As shown |

Table II shows the viscosities of compositions containing no copolymer and varying amounts of the copolymer.

Table II

| Copolymer content, parts by weight: | Brookfield viscosities at 25° C., centipoises |
|---|---|
| 0 | 10500 |
| 0.1 | 1360 |
| 0.25 | 1016 |
| 0.5 | 944 |
| 1 | 848 |

EXAMPLE 3

This example is identical to Example 1 except that the oil carrier is a naphthenic hydrocarbon oil having a specific gravity at 15.6° C. of 0.9230, an aniline point of 69° C., and Saybolt viscosity at 37.8° C. of about 156 seconds. The compositions tested have the following composition:

| | Parts by weight |
|---|---|
| N,N'-dimethyl-N,N'-dinitrosoterephthalamide | 23 |
| Desensitizing oil | 10 |
| Added oil | 67 |
| Copolymer | As shown |

Table III shows the viscosities of the compositions containing no copolymer and containing varying amounts of copolymer.

*Table III*

| Copolymer content, parts by weight: | Brookfield viscosities at 25° C., centipoises |
|---|---|
| 0 | 1960 |
| 0.1 | 280 |
| 0.25 | 256 |
| 0.5 | 256 |
| 1.0 | 260 |

EXAMPLE 4

This example is identical to Example 3 except that the blends tested have the following composition:

| | Parts by weight |
|---|---|
| N,N'-dimethyl-N,N'-dinitrosoterephthalamide | 35 |
| Desensitizing oil | 15 |
| Added oil (same as in Example 3) | 50 |
| Copolymer | As shown |

Table IV shows the Brookfield viscosities of the blends containing no copolymer and containing varying amounts of copolymer.

*Table IV*

| Copolymer content, parts by weight: | Brookfield viscosities at 25° C., centipoises |
|---|---|
| 0 | 14,250 |
| 0.1 | 6,480 |
| 0.25 | 3,920 |
| 0.5 | 3,480 |

EXAMPLE 5

This example illustrates the use of the compositions of this invention in the preparation of cellular polyurethane vulcanizates. A liquid reaction product is prepared by reacting one mole of a polytetramethylene ether glycol having a molecular weight of about 1000 with 1.6 moles of 2,4-tolylene diisocyanate at about 30° C. The final product has a Brookfield viscosity at 30° C. of about 17,000 centipoises and a free isocyanate content of 4.0–4.3%, by weight.

This polymer is compounded using the following recipe:

| | Parts by weight |
|---|---|
| Polyurethane | 100 |
| Silica | 5 |
| Polydimethylsiloxane | 1 |
| 4,4'-methylenebis(2-chloroaniline) | 12 |
| Dispersion of Example 2 using 0.5 part of copolymer in the composition of Example 2 | As shown |

The compounding is carried out as follows: The liquid polymer is heated to 96–99° C. The silica and the polysiloxane are mixed in. During this mixing the temperature drops to 85° C. The molten 4,4'-methylenebis(2-chloroaniline) is added and mixed in for 15 to 20 seconds. The blowing agent dispersion is added and mixed in for 30 to 45 seconds. The mixture is cast into a mold which has been preheated to 100° C., and the filled mold is placed in a 100° C. oven to cure the polymer. The polymer is cured for 3 hours.

The resulting products are sponge-like microcellular elastomers. Table V shows the properties of several microcellular vulcanizates using several different quantities of the blowing agent dispersion.

*Table V*

| Compound designation | A | B | C |
|---|---|---|---|
| Parts by weight of blowing agent dispersion | 2 | 4 | 8 |
| Density of cured product, lb./cu. ft. | 22 | 16 | 8.5 |
| Compression set, percent, under 50% deflection for 22 hrs., at 70° C. | 33 | 17 | 17 |
| Compression stress (25° C.) p.s.i.— | | | |
| at 10% deflection | 27 | 20 | 5 |
| at 25% deflection | 44 | 28 | 7 |
| at 50% deflection | 90 | 52 | 15 |

The measurements on the properties of the cured foams are made in accordance with the following ASTM Methods: Compression set by ASTM D-395-55, Method B; Compression deflection by ASTM D-575-46, Method A.

EXAMPLE 6

The procedure of Example A is followed except that the copolymer used has the following composition by weight, expressed as monomer content of the copolymer:

| | Parts |
|---|---|
| Technical lauryl methacrylate | 90 |
| 2-diethylaminoethyl methacrylate | 10 |

This copolymer is prepared by copolymerizing 90 parts of technical lauryl methacrylate and 10 parts of 2-diethylaminoethyl methacrylate in the presence of alpha, alpha'-azodiisobutyronitrile in a nitrogen atmosphere at 78° C. for 4 hours and then at 95° C. for about an hour. The copolymer is used as a 40% solution in a light, solvent-extracted, neutral hydrocarbon oil having a Saybolt viscosity of 135±10 seconds at 37.8° C.

Using the oil carrier of Example 1, a blend is prepared having the following composition:

| | Parts by weight |
|---|---|
| N,N'-dinitroso-N,N'-dimethylterephthalamide | 35 |
| Desensitizing oil | 15 |
| Added naphthenic hydrocarbon oil | 50 |
| Copolymer | 0.4 |

The Brookfield viscostiy at 25° C. of the composition before the addition of the copolymer is 10,000 centipoises; after addition of the copolymer, the Brookfield viscosity is 400 centipoises.

It is understood that the preceding representative examples may be varied within the scope of the total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A composition comprising, by weight (a) 20 to 40 parts of N,N'-dimethyl-N,N'-dinitrosoterephthalamide, (b) 80 to 60 parts of a naphthenic hydrocarbon oil having a Saybolt viscosity at 37.8° C. (100° F.) of between about 75 seconds and 400 seconds, the total of (a) and (b) equaling 100 parts, containing, in addition, as a viscosity reducing ingredient (c) about 0.1 to 1 part, by weight, of a copolymer containing units (1) 2-diethylaminoethyl methacrylate and (2) units of a monomer of general formula

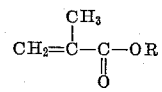

wherein R is an acyclic hydrocarbon radical containing 10 to 20 carbon atoms, the final polymer containing, by weight, 5–20 percent of units of 2-diethylaminoethylmethacrylate, and the sum of (1) and (2) being at least 35 percent by weight of the total copolymer.

2. A composition according to claim 1 wherein said copolymer (c) consists of from 10 to 5 percent by weight of 2-diethylaminoethyl methacrylate units and from 90 to 95 percent by weight of technical lauryl methacrylate units.

3. A composition according to claim 1 wherein said copolymer (c) consists of from 20 to 10 percent by weight of 2-diethylaminoethyl methacrylate units, from 45 to 50 percent by weight of technical octadecenyl methacrylate units and from 35 to 40 percent by weight of styrene units.

4. A method for reducing the viscosity of a mixture comprising (a) 20 to 40 parts of N,N'-dimethyl N,N'-dinitrosoterephthalamide, and (b) 80 to 60 parts of a naphthenic hydrocarbon oil having a Saybolt viscosity at 37.8° C. (100° F.) of between about 75 seconds and 400 seconds, the total of (a) and (b) equaling 100 parts, which method comprises adding to said mixture (c) from about 0.1 to 1 part, by weight, of a copolymer containing units of (1) 2-diethylaminoethyl methacrylate and (2) units of a monomer of the general formula $$CH_2=\overset{CH_3}{\underset{}{C}}-\underset{\underset{O}{\parallel}}{C}-OR$$

wherein R is an acyclic hydrocarbon radical containing 10 to 20 carbon atoms, the final polymer containing, by weight, 5–20 percent of units of 2-diethylaminoethyl methacrylate, and the sum of (1) and (2) being at least 35 percent by weight of the total copolymer.

5. A method according to claim 4 wherein said copolymer (c) consists of from 10 to 5 percent by weight of 2-diethylaminoethyl methacrylate units and from 90 to 95 percent by weight of technical lauryl methacrylate units.

6. A method according to claim 4 wherein said copolymer (c) consists of from 20 to 10 percent by weight of 2-diethylaminoethyl methacrylate units, from 45 to 50 percent by weight of technical octadecenyl methacrylate units and from 35 to 40 percent by weight of styrene units.

References Cited in the file of this patent
UNITED STATES PATENTS

| 2,737,452 | Catlin | Mar. 6, 1956 |
| 2,737,496 | Catlin | Mar. 6, 1956 |
| 2,904,522 | Catlin | Sept. 15, 1959 |